United States Patent [19]

Ichimi et al.

[11] 4,043,350
[45] Aug. 23, 1977

[54] EMERGENCY GAS SHUT-OFF UNIT MOUNTED ON GAS PRESSURE ADJUSTING UNIT

[76] Inventors: Shigeru Ichimi; Hideo Ichimi; Kenjiro Funabashi, all of Aichi, Japan

[21] Appl. No.: 625,274

[22] Filed: Oct. 23, 1975

[30] Foreign Application Priority Data

Nov. 13, 1974  Japan .................................. 49-13738

[51] Int. Cl.² ............................................ F16K 17/36
[52] U.S. Cl. ..................................... 137/39; 137/495; 251/67
[58] Field of Search ....................... 137/65, 66, 38, 39, 137/495; 251/66, 67

[56] References Cited
U.S. PATENT DOCUMENTS

| | | | |
|---|---|---|---|
| 900,260 | 10/1908 | Boyd | 251/67 |
| 2,023,276 | 12/1935 | Lovekin | 251/66 X |
| 2,752,930 | 7/1956 | Stouder | 137/495 X |
| 3,406,700 | 10/1968 | Beazer | 137/39 |

*Primary Examiner*—Robert G. Nilson
*Attorney, Agent, or Firm*—Fred Philpitt

[57] ABSTRACT

The emergency shut-off unit for escaping gas is comprised of a cylinder and a valve piston that runs through the cylinder, and the cylinder is screwed to a thread hole formed on the bottom wall on straight line extension of a projecting shaft of a diaphragm of a gas pressure adjusting unit, and the valve piston is placed inside of the cylinder at its tip portion and at the other end side a pin is detachably inserted into a location of the piston protruding from the cylinder so as to be retained, and when the pin is pulled out from the valve piston, the tip of the valve piston jumps off resiliently from the cylinder and the projecting shaft of the diaphragm is pushed up by the junping off of the valve piston and a valve body is made to close the nozzle portion of a gas supply passage of the gas pressure adjusting unit.

2 Claims, 3 Drawing Figures

EMERGENCY GAS SHUT-OFF UNIT MOUNTED ON GAS PRESSURE ADJUSTING UNIT

BACKGROUND OF THE INVENTION

The present invention relates to an emergency shut-off unit for escaping gas mounted on a gas pressure adjusting unit, and more particularly to an emergency shut-off unit for escaping gas in which a gas supply nozzle provided in the gas pressure adjusting unit mounted on the gas cylinder is automatically completely closed when the gas cylinder falls down violently on account of earthquakes or other causes, whereby the leakage of gas in the gas cylinder can be completely stopped.

Heretofore, steam pressure of LP gas filled in the gas cylinder is liable to the fluctuation by composition of LP gas and atmospheric temperature, and therefore in case the LP gas is used as fuel, a gas pressure adjusting unit is installed on the gas cylinder for LP gas in order to supply the gas into a combustion unit which is maintained of optimum pressure for complete combustion constantly without relation to the change of pressure in the gas cylinder.

However, the gas pressure adjusting unit provided on the gas cylinder, particularly, the gas pressure adjusting unit for the gas cylinder generally used in households is supplied with the gas from the gas cylinder automatically continuously unless the main valve of the gas cylinder is closed. Therefore, even in case the gas cylinder falls down violently due to earthquakes and other causes, the gas is kept supplied to the gas pressure adjusting unit form the gas cylinder, and assuming if the pipe connnecting the gas pressure adjusting unit and the combustion unit is disconnected, the gas is jetted out into the atmosphere from the gas pressure adjusting unit which gives a rise to unexpected accidents such as explosions or fires which are extremely dangerous to those who live there.

The present invention has completely solved the foregoing problems.

SUMMARY OF THE INVENTION

An object of the present invention is to provide an emergency shut-off unit for escaping gas, and more particularly an emergency shut-off unit for escaping gas mounted on the gas pressure adjusting unit which is capable of completely shutting off the jet-out of the gas from the gas cylinder when the gas cylinder used in general households falls down violently and capable of being easily installed on a gas pressure adjusting unit which is generally mounted on the gas cylinder.

A still another object of the present invention is to provide an emergency shut-off unit for escaping gas which is capable of shutting off automatically the supply of gas instantly not only when the gas cylinder falls down violently but also when the gas cylinder falling down and the pipe connecting the combustion unit is to be disconnected from the gas pressure adjusting unit.

A further object of the present invention is to provide an emergency shut-off unit for escaping gas which is capable of completely shutting off the supply of gas without trouble even in case the violent vibrations continue while the gas cylinder fell down.

A still further object of the present invention is to provide an emergency shut-off unit for escaping gas having high safety factor arising from extremely simple and positive operations of the emergency shut-off unit for escaping gas.

Figure 2:
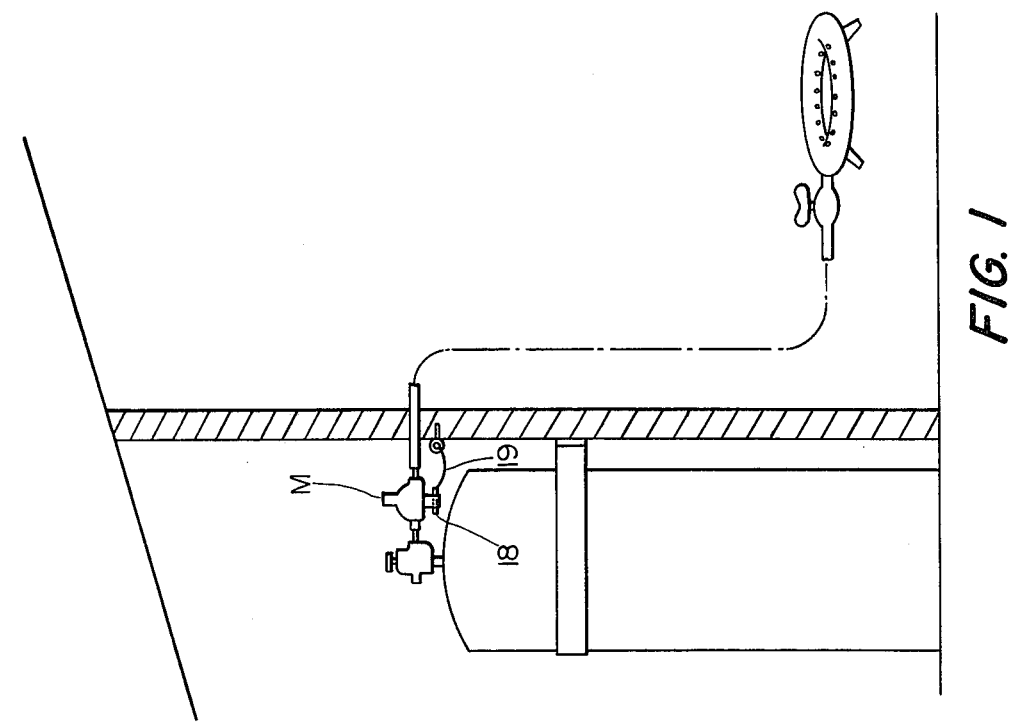
FIG. 2 is a sketch showing the gas cylinder disconnected from the appliance.
Figure 1:
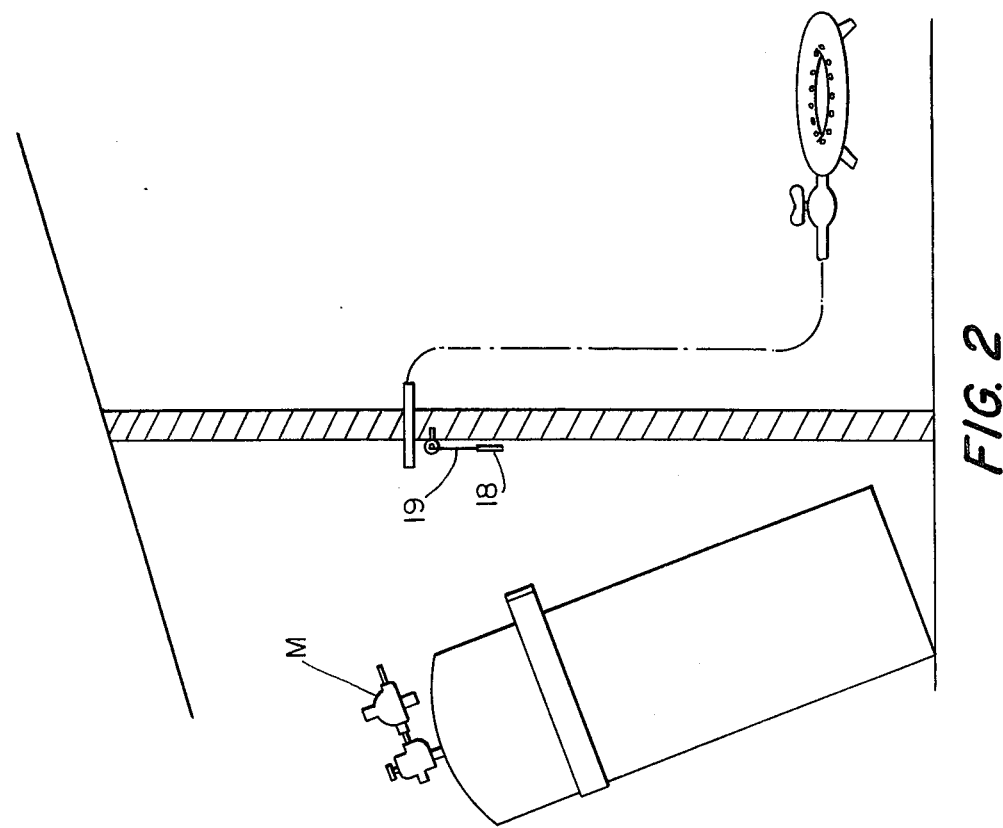
FIG. 1 is a sketch which shows a gas cylinder connected through a wall to a heating appliance with the emergency shut-off unit in place.
Figure 3:
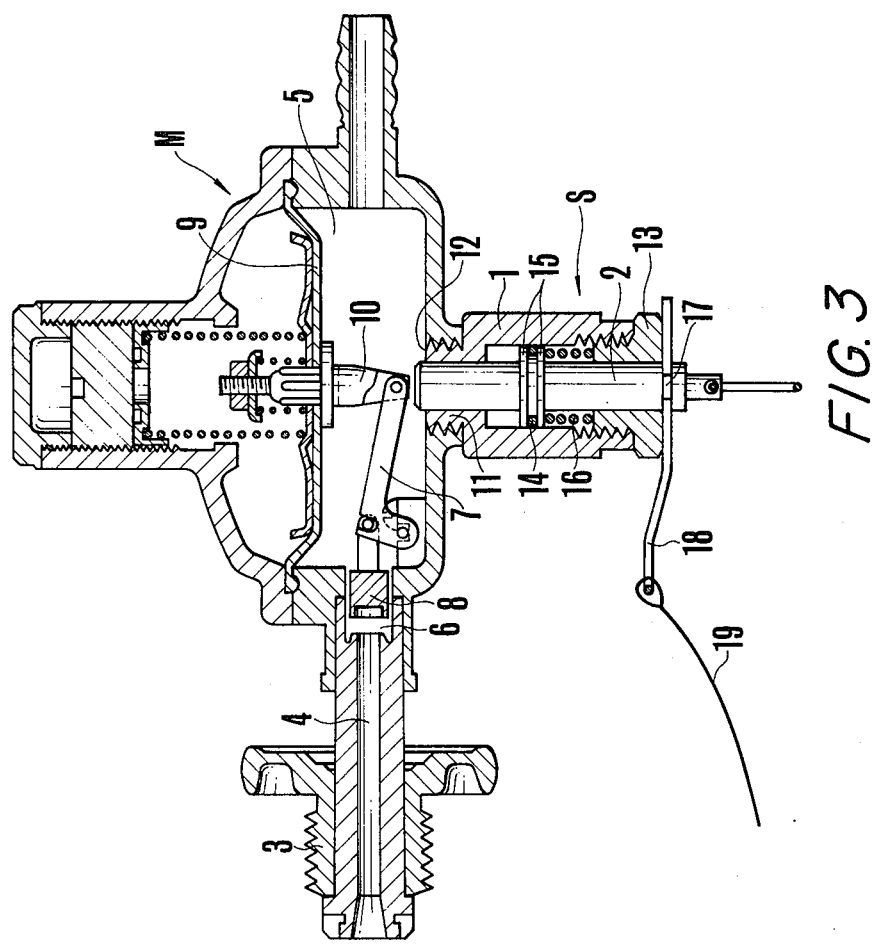
FIG. 3 is a vertical cross section of an emergency shut-off unit for escaping gas according to the present invention which is installed on a gas pressure adjusting unit.

DETAILED DESCRIPTION OF THE INVENTION:

The emergency shut-off unit for escaping gas according to the present invention is represented by an ordinary character S, and this emergency unit is formed of a unit consisting of a cylinder 1 and a valve piston 2 that is resiliently installed through the cylinder 1, and said unit is installed on the bottom wall of the gas pressure adjusting unit M.

The foregoing gas pressure adjusting unit M is installed on the gas cylinder used in general household, and a connecting fitting 3 is used for connecting the gas cylinder and a communicating pipe 4 of the adjusting unit, and a valve body 8 connected to a tip of a valve lever 7 is installed in a tip nozzle portion 6 of a gas supply passage communicating from the communicating pipe 4 to a pressure reducing chamber 5, and a hook shaped bent end portion of said valve lever 7 pivotally is connected to a part of the adjusting unit M, and the other end is pivotally connected to a projecting shaft 10 of a diaphragm 9, and the valve body 8 is caused to operate in horizontal direction by the valve lever 7 interlocked with the vertical operation of the diaphragm 9, and the nozzle portion 6 is made to be open/closed, and the supply of gas is maintained at fixed pressure.

The cylinder 1 of the emergency shut-off unit S for escaping gas is integrally formed with a projecting short cylinder portion 11 at its tip, and this short cylinder portion 11 is screwed to a thread hole 12 opens on the straight line extension of the projecting shaft 10 of the diaphragm, and the bottom wall of the gas pressure adjusting unit M, and the other end of the cylinder 1 is screwed with a cap 13. The valve piston 2 is inserted through the cylinder 1 from the cap 13 and runs through the short cylinder portion 11, and said valve piston 2 is formed with a flange 15 on its periphery which is provided with an O ring 14, and between the flange portion 15 of the valve piston 2 and the cap 13 of the cylinder 1, a coil spring 16 is inserted. The valve piston 2 is extracted outward of the cap 13 by resisting to the spring 16 until its tip is drawn and positioned at the inside of the short cylinder portion 11 of the cylinder 1, and a pin 18 similar in shape to hairpin is engaged on a grooved portion 17 formed on the head portion of the valve piston 2 projecting outward of the cap 13, and when the pin 18 is escaped from the grooved portion 17 of the valve piston 2, the tip of the valve piston 2 jumps off from the short cylinder portion 11 of the cylinder 1 by means of the resilient force of the spring 16 to push the projecting shaft 10 of the diaphragm 9 upward and the valve body 8 connected to the valve lever 7 is closed by the nozzle portion 6 under pressure.

The pin 18 is connected to the column of the house by means of a cord or chain 19. The chain 19 is of length making its slackening distance is a minimum, and when the chain 19 is connected to the column, and the like, simultaneous with the start of vibrations, namely, before the falling down of the gas cylinder, namely, the gas cylinder is in tilt to cause the pipe connected to the gas equipment to be disconnected, the pin 18 can be pulled out from the head portion of the valve piston 7.

Accordingly, the present invention is constructed in such a way that when the gas cylinder falls down violently due to the earthquakes or other causes, the pin 18 is disengaged from the grooved portion 17 of the valve piston as the pin 18 is pulled by the cord or the chain 19 connected to the column of the house, and the tip of the valve piston 2 is caused to project outer portion of the cylinder 1, and push the projecting shaft 10 of the diaphragm 8 upward, and the valve lever 7 is operated by being interlocked with the projecting shaft 10, and the valve body 8 is pushed strongly against the nozzle portion 6 and the supply of gas from the gas cylinder is automatically and positively shut off. Even when the violent vibrations continue with the earthquakes are still active while the gas cylinder is in laid condition, there is no chance that the pressure of the valve piston of the emergency shut-off unit S is disturbed, and as a result, the closure of the valve body 8 can be maintained. Therefore, the emergency shut-off unit for escaping gas has extremely high safety factor and moreover the emergency shut-off unit can be easily and simply mounted on the currently commercially available gas pressure adjusting unit.

What is claimed is:

1. In the known combination of a gas cylinder and a gas pressure adjusting unit attached thereto which includes an adjusting unit housing, a gas inlet to said adjusting unit housing from said gas cylinder, a gas outlet from said adjusting unit housing, and a valve within said adjustment housing for controlling the admission of gas through said gas inlet into said adjustment unit housing, the improvement consisting of an emergency gas flow shut off device that will automatically cut off in the event the gas cylinder falls down because of an earthquake or other causes, said gas flow shut off device comprising in combination a valve piston housing that is attached to and which opens into one side of said adjusting unit housing, a valve piston mounted in said valve piston housing so as to extend through the end of the valve piston housing that is attached to said adjusting unit housing and into the adjusting unit housing itself, spring means between the exterior of said valve piston and the interior of said valve piston housing, said spring being mounted with respect to said valve piston so as to urge said valve piston into the interior of said adjusting unit housing and against the valve in said housing in such a way as to close said valve, pin means engageable with the end of the valve piston that is opposite to the end of the valve piston that extends into the adjusting unit housing, and when said pin means is engaged with said end of the valve piston said spring means is in its compressed condition, connector means connecting said pin means to a fixed wall, whereby, in the event that the gas cylinder falls down because of an earthquake or similar causes, the connector means will pull the pin means from engagement with the end of the valve piston and the thus released valve piston will move inwardly into the interior of said adjusting unit housing under the force exerted by said spring means and in moving inwardly will bear against the valve in the adjusting unit housing so as to close the gas inlet against further gas flow from said gas cylinder.

2. The device according to claim 1 wherein said valve in said adjusting unit housing consists of a valve mounted on a lever arm and said valve piston is positioned to bear against said lever arm when the valve piston is released by said connector means.

* * * * *